United States Patent [19]

Paszyc et al.

[11] 4,123,697
[45] Oct. 31, 1978

[54] ELECTROSTATIC HIGH POTENTIAL SYSTEM

[75] Inventors: Aleksy J. Paszyc, Ventura; Dallas M. Shiroma, Oxnard; Kwang T. Huang, Ventura, all of Calif.

[73] Assignee: The United States of America as represented by the Secretary of the Navy, Washington, D.C.

[21] Appl. No.: 812,883

[22] Filed: Jul. 5, 1977

[51] Int. Cl.² .............................................. H02N 1/10
[52] U.S. Cl. ................................. 322/2 A; 310/308; 310/309
[58] Field of Search ............... 322/2 R, 2 A; 310/300, 310/308, 309, 310, 10, 11

[56] References Cited

U.S. PATENT DOCUMENTS

| | | | |
|---|---|---|---|
| 1,084,594 | 1/1914 | Norton et al. | 310/309 |
| 2,004,352 | 6/1935 | Simon | 310/308 |
| 2,477,947 | 8/1949 | Yadoff | 310/309 X |
| 2,827,577 | 3/1958 | Kimberlin, Jr. et al. | 310/310 X |
| 3,035,221 | 5/1962 | Gale | 322/2 A |
| 3,122,660 | 2/1964 | Giannini et al. | 310/300 X |
| 3,400,282 | 9/1968 | Felici | 310/300 X |
| 3,558,286 | 1/1971 | Gourdine | 310/10 X |
| 3,681,604 | 8/1972 | Criswell et al. | 310/300 X |
| 3,816,771 | 6/1974 | Moir | 310/308 |

Primary Examiner—Donovan F. Duggan
Attorney, Agent, or Firm—Richard S. Sciascia; Joseph M. St.Amand

[57] ABSTRACT

An electrostatic high potential device which utilizes the generation of electrostatic charges on moving oil to produce a high potential difference on the order of thousands of volts. A metal encased ionizing device or charge generator with a system of passageways of dielectric material has an oil moving therethrough and against the dielectric material to cause a transfer of electric charges between the oil and passageway surfaces. The passageways act as baffles and provide a large amount of surface contact between the oil and dielectric material. The conductive housing of the ionizing device is grounded to draw off the charges on the dielectric material, and a pump circulates the charged oil from the ionizing device to a charge storage device of similar design. Electrodes in the charge storage device draw off the charges on the oil.

12 Claims, 7 Drawing Figures

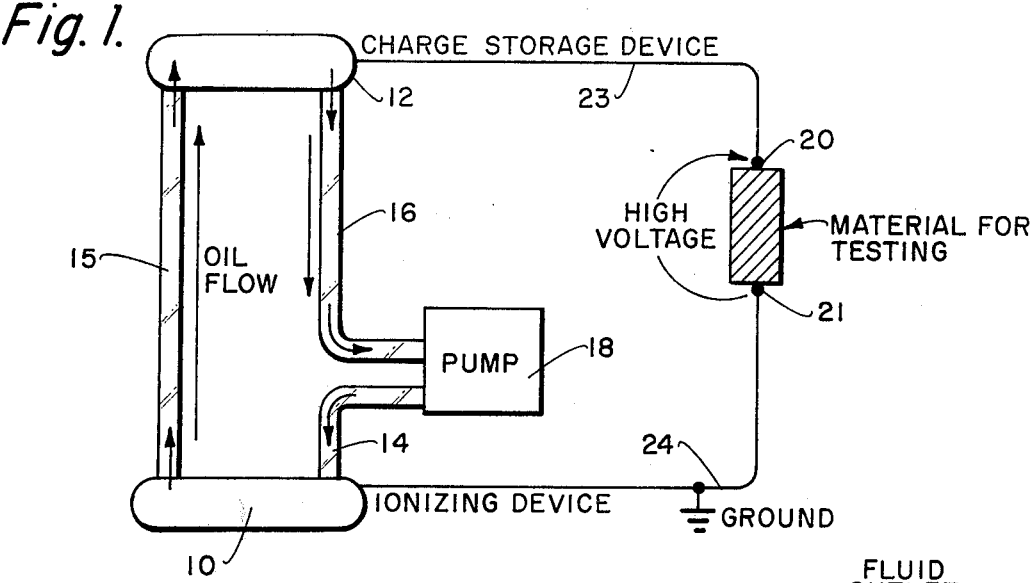
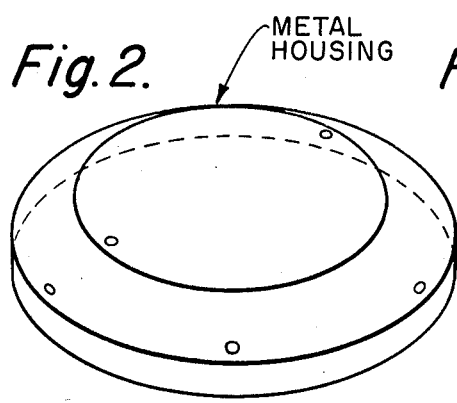
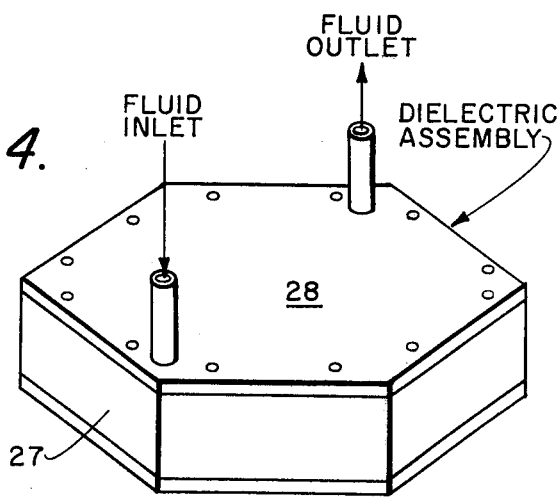
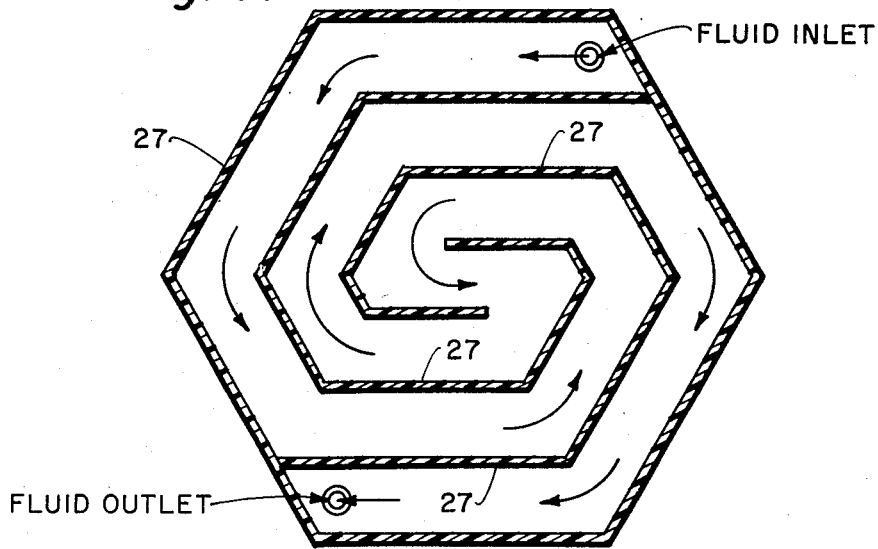

TREE ELECTRODES

WIRE SCREEN FILTERS

ELECTROSTATIC HIGH POTENTIAL SYSTEM

BACKGROUND OF THE INVENTION

The invention is related to electrostatic high potential devices and more particularly to the generation of electrostatic charges on moving oil to produce a high potential.

A potential difference is generally produced by the separation and storage of charges. Various electrical means are available to do this, but they tend to be somewhat limited. Transformers and rectifier circuits can produce a high DC potential but the output is limited by reverse voltages on diodes and capacitors, and an AC input is required.

Another method is the charging of capacitors in parallel, then through a switching arrangement connecting them in series. An example of this is the Marx high voltage generator, but with this device, the main disadvantage is that to generate a high voltage, physically large capacitors are required making the device bulky and very heavy, and an additional DC supply necessary for its operation. Also, another high voltage device is the Van De Graaf generator. However, it too is large, costly and requires an additional electrical source.

Still another device charges gases or air bubbles that may be carried in an oil medium.

There are various other types of devices for generating electrostatic charges; however, none operate in the same manner as the present device.

The generation of electrostatic charges on moving oil is a widely observed phenomenon, especially in fuel handling operations, where it is a potentially hazardous condition. The phenomenon, however, demonstrates the use of oil as a charge carrier.

A potential difference on the order of thousands of volts can be generated by using oil as the charge carrying medium to separate and store electrostatic charges. Such a device is compact, relatively light and inexpensive, requires minimum maintenance, and has widespread applications in the high voltage testing of cables and insulation materials, for example.

The present invention is directed to a method and apparatus for generating electrostatic charges wherein oil is pumped against another dielectric material configured as a system of dielectric baffles or passageways within a metal shell. The charge storage device is similarly constructed, but with a series of electrodes added which function to draw off the charge on the oil.

BRIEF DESCRIPTION OF THE DRAWINGS

FIG. 1 is an illustration of one embodiment of the electrostatic high potential system of the present invention;

FIG. 2 illustrates a type of housing used for both the ionizing device and charge storage device used in the system of FIG. 1;

FIG. 3 shows a horizontal cross-sectional view of the dielectric passageway assembly in the ionizing device;

FIG. 4 is an exterior view of the dielectric passageway/baffle assembly used in both the ionizing device and charge storage device;

DESCRIPTION OF PREFERRED EMBODIMENT

Figure 5:
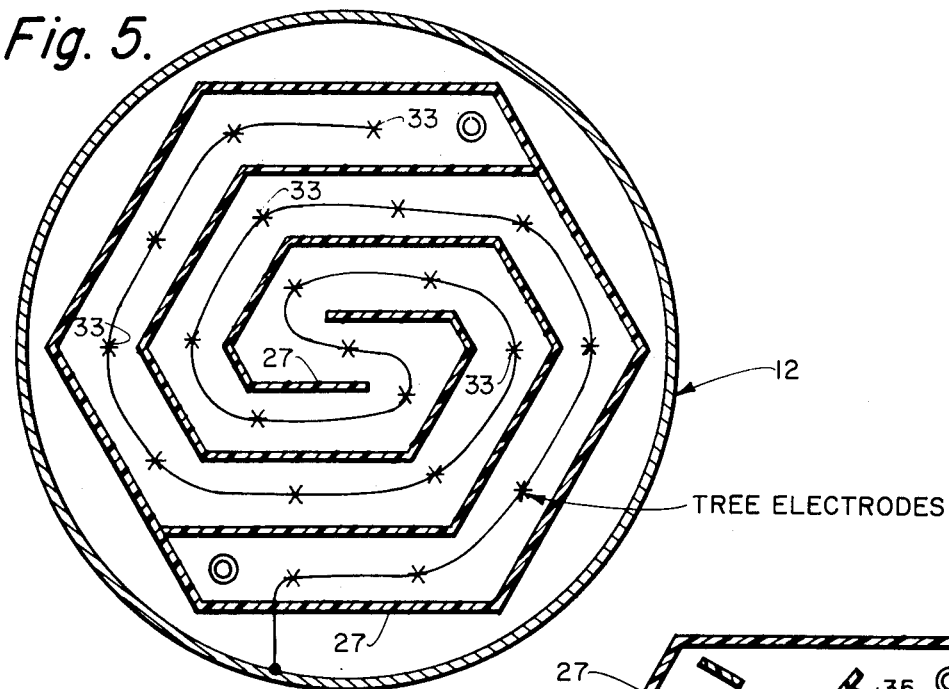
FIG. 5 is a horizontal cross-sectional view of the dielectric passageway of the charge storage device.

The operational principle of the present electrostatic high potential apparatus is that there is a potential difference produced whenever charges are separated and stored. A basic diagram of the system illustrated in FIG. 1.

When oil, a dielectric fluid, moves against another dielectric material, there is a transfer of charge and both materials become oppositely charged. In the system shown in FIG. 1, oil is caused to flow through an ionizing (i.e., charge generating) device 10 to a charge storage device 12 and return, via a series of conduits 14, 15 and 16 by means of a pump 18. Conduits 14, 15 and 16 are made from plastic such as polyvinylchloride tubing or other suitable dielectric material. The oil is circulated from the ionizing device to the charge storage device until a high potential charge is accumulated. Items to be tested, such as insulation, or other equipment can be connected across the high voltage terminals 20 and 21. Terminal 20 is electrically connected via line 23 to the charge storage device 12 and terminal 21 is electrically connected to ionizing device 10 and ground via line 24.

In the ionizing device, which is in the form of a dome shaped shell or housing, for example such as shown in FIG. 2, there is a system of baffles in the form of somewhat spiral passageways, such as shown in FIG. 3. The housing 10 is electrically conductive and preferrable made of metal such as aluminum or copper, for example. While a dome shaped housing is shown in FIG. 2 any other suitable shape of housing can be used. The housings are similar for both the ionizing device 10 and charge storage device 12.

The walls 27 of the spiral passageways, as shown in FIG. 3, act as baffles and are preferrable made from plexiglass plastic; however, other suitable dielectric materials such as plastic, nylon, glass, etc., can be used. The top and bottom of the spiral passageways are also made of plastic plexiglass and form a closed unit 28 when assembled, as shown in FIG. 4.

The spiral passageways provide a large area of surface contact between the oil and the dielectric material of the passageway walls, as the oil passes therethrough, thereby aiding in the ionizing process of the oil. The conductive housing 10 is grounded to draw off charges on the dielectric material of spiral walls.

A pump 18 circulates the charged oil from ionizing device 10 to the charge storage device 12 via dielectric conduit 15 or other similar means. After passing through storage device 12 the oil is returned through pump 18 for recirculation through ionizing device 10. A pump that does not require an electric source of power for operation can be used; however, if an electrically operated pump is used it should be properly insulated electrically from the rest of the system.

Charge storage device 12 is also constructed similarly to the ionizing device. The housing of the charge storage device is also made from a good electrically conductive material such as aluminum, copper, etc. and contains a spiral passageways assembly like that shown in FIG. 4 formed from dielectric material. Plexiglass is preferred for the spiral walls although other dielectric materials such as nylon, glass, etc. can be used. However, in addition to the spiral passageways the dielectric assembly in charge storage device 12 has a plurality of tree electrodes 33 electrically connected together and to the metal housing. These tree electrodes protude into the spiral passageways. The spiral passageways in the charge storage device merely provide a long passageway through which the dielectric fluid flows while contacting electrodes 33. Electrodes 33 intensify the electric field and act to discharge the electric charges on the oil, i.e., draw off the charges and store them along the equipotential surface of the conductive housing 12.

Figure 6:
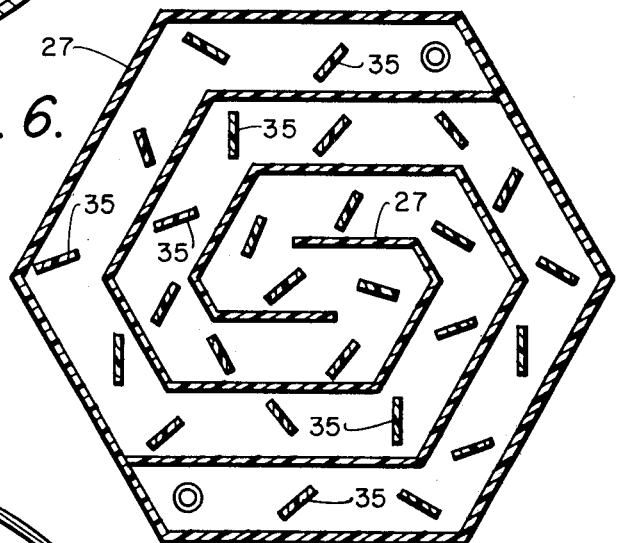
FIG. 6 is a cross-sectional view, as in FIG. 3 showing additional baffles placed within the spiral passageways of the ionizing device.
Figure 7:
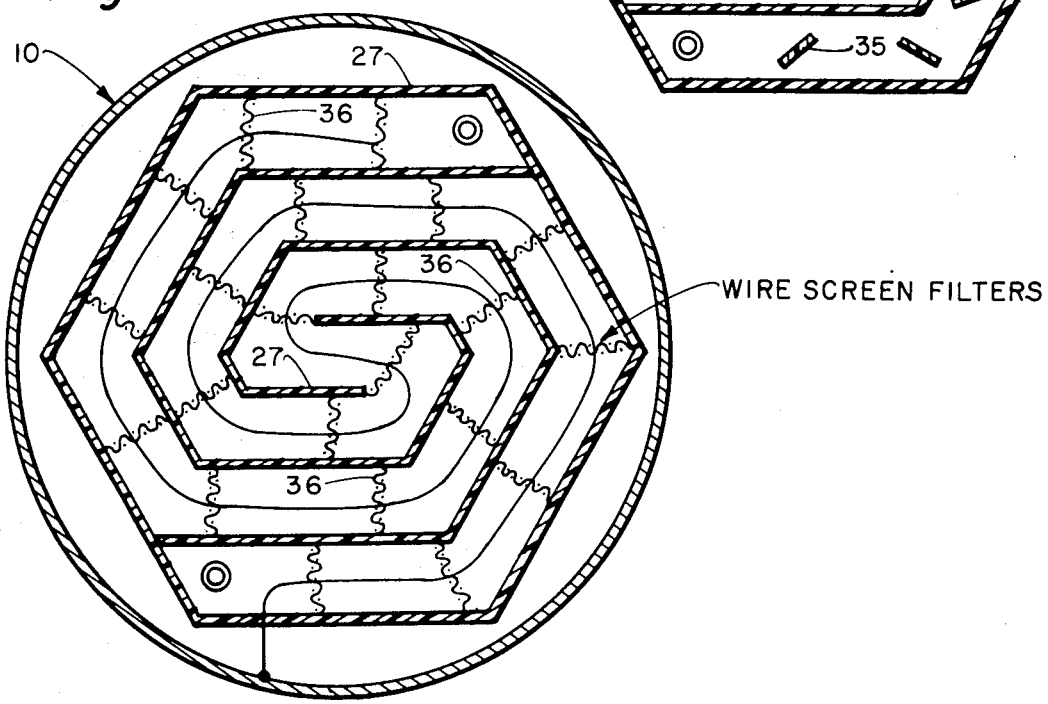
FIG. 7 is a cross-sectional view as in FIG. 3 showing wire screen filters in the passageways of the ionizing device to enhance charge generation.

If desired, additional baffles 35 made of insulating material can be placed within the spiral channels of the dielectric assembly inside the metal housing of the ionizing device, such as shown in FIG. 6, for example. Further, wire screen filters 36, electrically connected to the housing of ionizing device 10, can be placed across the spiral passageways to increase the charge generation.

This system utilizes a mechanical means, i.e. a fluid pump, rather than an electrical means, to produce charge separation and provide high potential. A potential in excess of a thousand volts can be generated in this manner.

Other types of baffles (i.e. passageways, packing, etc.) to increase the surface contact between the oil and dielectric material can be used as desired.

Any type of dielectric fluid can be used in the present system; however, dielectric fluids of high resistivity are preferred so charges will not bleed off. Transformer oil has a very high resistivity and operates well in the system. It has also been found that the addition of distilled water (also a good dielectric) to the oil, up to 10% of the dielectric fluid in the system, will enhance the ability of the system to generate a high potential. The preferred mixture is 9% distilled water with the balance (i.e. 91%) of the dielectric fluid in the system being transformer oil, for example; this has provided the greatest potential charge. When greater than 10% distilled water is used in the dielectric fluid mixture, the charge begins to bleed off.

Voltages of from 50,000 to 60,000 volts have been generated with the present system (limited only by Corona discharge where the output electrodes are exposed to the atmosphere) with a dielectric fluid of 91% transformer oil and 9% distilled water, a flow rate of 3.25 gallons per minute through dielectric passageways in the ionizing device of 2.25 sq. inch cross-section and a mean flow path of 2.8 feet.

The advantages of using the electrostatic high potential device of this invention are numerous. There is no limit to the voltage that can be generated by the present electrostatic high potential device as it does not use diodes, capacitors, etc. to develop the high voltage. Another significant advantage is that the system input is mechanical and does not require electrical input. Thus it can be operated in areas where no electrical power is available or even under conditions where electrical power is lost; these are conditions under which other high potential devices would be inoperable.

The present electrostatic high potential system can be made relatively small and compact and requires a minimum of maintenance.

Obviously many modifications and variations of the present invention are possible in the light of the above teachings. It is therefore to be understood that within the scope of the appended claims the invention may be practiced otherwise than as specifically described.

What is claimed is:
1. A high voltage generating system, comprising:
(a) a conductive ionizing chamber having a fluid inlet at one side thereof and a fluid outlet at the opposite side thereof;
(b) a first dielectric baffle means of large surface area within said ionizing chamber between the fluid inlet and the fluid outlet thereto;
(c) a conductive charge storage chamber having a fluid inlet at one side thereof and a fluid outlet at the opposite side thereof;
(d) a second dielectric baffle means of large surface area within said charge storage chamber between the fluid inlet and the fluid outlet thereto;
(e) a first dielectric conduit means connected between the fluid outlet from said ionizing chamber and the fluid inlet to said charge storage chamber;
(f) a second dielectric conduit means connected between the fluid outlet from said charge storage chamber and the fluid inlet to said ionizing chamber;
(g) a dielectric fluid of high resistivity filling said ionizing chamber, said charge storage chamber, and said first and second dielectric conduit means; said dielectric fluid being operable to generate electrostatic charges when moved against the surface of said first dielectric baffle means within said ionizing chamber;
(h) means operable to continuously circulate said dielectric fluid through said ionizing chamber and said charge storage chamber via said first and second conduit means wherein said dielectric fluid moving against the surface of said first dielectric baffle means is electrostatically charged;
(i) electrode means being located within said second dielectric baffle means and electrically connected to said charge storage chamber between the inlet and outlet thereto; said electrode means being operable to draw off the electrostatic charges from said charged dielectric fluid as said fluid is circulated through said charge storage chamber wherein an electrostatic high potential is produced and made available for use between said ionizing chamber and said charge storage chamber.

2. A system as in claim 1 wherein said dielectric fluid is oil.

3. A system as in claim 1 wherein said dielectric fluid consists of from 90 to 100 percent oil and from 0 to 10 percent distilled water.

4. A system as in claim 1 wherein said dielectric fluid consists of approximately 91 percent transformer oil and 9 percent distilled water.

5. A system as in claim 1 wherein each of said first and second dielectric baffle means comprise at least one spiral passageway through which said dielectric fluid is moved.

6. A system as in claim 5 wherein additional dielectric baffles are placed within the dielectric spiral passageway in said ionizing chamber.

7. A system as in claim 5 wherein said dielectric baffles are made from plastic plexiglass.

8. A system as in claim 5 wherein said electrode means comprises a plurality of electrodes disposed along the length of said at least one spiral passageway.

9. A system as in claim 5 wherein a plurality of wire screen filters are placed along the length of said at least one passageway for enhancing the generation of electrostatic charges on the dielectric fluid as it circulates therethrough in said ionizing chamber.

10. A system as in claim 1 wherein said ionizing chamber is grounded.

11. A system as in claim 1 wherein both said conductive chambers are of highly conductive metal.

12. A system as in claim 1 wherein said ionizing chamber and said charge storage chamber are connected to respective output electrodes.

* * * * *